Patented Mar. 17, 1953

2,631,996

UNITED STATES PATENT OFFICE 2,631,996

BF₃-IODINE POLYMERIZATION OF UNSATURATED HYDROCARBON MIXTURES

Francis T. Wadsworth, Dickinson, Tex., assignor to Pan American Refining Corporation, Texas City, Tex., a corporation of Delaware No Drawing. Application December 20, 1951, Serial No. 262,671

5 Claims. (Cl. 260—82)

This invention relates to synthetic resins and particularly to synthetic hydrocarbon resins. More specifically, my invention relates to the production of synthetic hydrocarbon resins of improved color from a mixture of unsaturated hydrocarbons obtained in the high-temperature pyrolysis of normally gaseous hydrocarbons.

Many methods are disclosed in the prior art for preparing resins from unsaturated hydrocarbons by catalytic and non-catalytic polymerization thereof. One suitable type of unsaturated hydrocarbon mixture can be produced by the high-temperature pyrolysis of normally gaseous hydrocarbons, in which treatment the hydrocarbons undergo a complex group of reactions, including cracking, dehydrogenation, conjugation, aromatization, polymerization, and the like, whereby the hydrocarbons are converted into a heterogeneous mixture comprising olefins, diolefins, cycloolefins, aromatics, and a variety of other derivatives of diverse physical properties, the entire mixture extending in complexity from ethylene to solids of high melting point. This mixture can be separated or converted into a number of useful products, including pure aromatics, pure olefins, diolefins, and resins. The resins have in general been of limited utility, however, owing to their comparatively dark color, their color instability, and their tendency toward mechanical failure during aging. Moreover, the resins have exhibited little or no response to the usual methods of decolorizing, such as treatment with strong mineral acids or with adsorbent solids.

I have now discovered a method whereby stable resins of light color and low iodine number can be prepared from certain unsaturated hydrocarbon mixtures and fractions thereof, obtained as hereinafter described by pyrolysis of normally gaseous hydrocarbons containing two or more carbon atoms in the molecule. My improved resins are obtained by polymerizing an unsaturated hydrocarbon charging stock of the aforesaid class at a temperature above about 500° F. in the presence of catalytic proportions of boron trifluoride and iodine.

One object of my invention is to prepare a hydrocarbon resin of improved chemical and physical properties. Another object is to prepare a hydrocarbon resin of low iodine number, light color, and improved stability. A further object is to prepare a useful hydrocarbon resin from an unsaturated liquid mixture obtained in the pyrolysis of normally gaseous hydrocarbons. A still further object is to reduce the effect of oxidizing agents and organic oxygenated compounds during the BF₃-polymerization of unsaturated hydrocarbon mixtures. Other objects of my invention and its advantages over the prior art will be apparent from the present description thereof and from the appended claims.

The charging stock in my process is an unsaturated hydrocarbon liquid or fraction thereof commonly referred to as "Dripolene," which is obtained as a by-product from the high-temperature pyrolysis of a normally gaseous hydrocarbon containing two or more carbon atoms in the molecule, or a mixture of such hydrocarbons such as natural gas or by-product gases from the cracking of heavy petroleum oils in the manufacture of gasoline. In the preparation of Dripolene, a gaseous hydrocarbon or mixture of hydrocarbons, preferably propane, a mixture of propane and propylene, or a natural gas rich in propanes and/or butanes is preheated and passed through an alloy tube in a furnace, where it is exposed at high space velocity to a pyrolysis temperature of at least about 1300° F., preferably between about 1350 and 1550° F. Low or moderately elevated pressures up to about 100 pounds per square inch are ordinarily employed in this operation, a pressure of 5 to 40 pounds per square inch gage at the reactor outlet being generally used. The stream of gas should be passed through the furnace at high velocity, so that the time of exposure to the high temperature is limited to about 0.2 to 5 seconds, around 1 second being preferred.

The hot gases leaving the pyrolysis zone are immediately cooled below reaction temperature, preferably below about 100° F., by quenching with a stream of water, oil, or other cooling medium, whereby further pyrolysis, polymerization, or degradation of the reaction product is prevented. From a quenching zone, a liquid-phase mixture of the cooling medium and unsaturated hydrocarbons is withdrawn, the latter being known in the art as "Dripolene." The Dripolene is separated from the quenching liquid by stratification (where the two liquids are immiscible, as from water), or by distillation (as from an absorber oil). The yield of liquid hydrocarbons is ordinarily around 3 percent by weight of the total quantity of gas charged to the pyrolysis zone, the remainder of the gas being converted to lower-molecular-weight hydrocarbons such as ethylene and methane, and to hydrogen. A typical specimen of Dripolene has the following properties and composition:

ASTM distillation range, °F.:
- Initial ............................. 100
- 10% ................................ 146
- 20% ................................ 162
- 30% ................................ 178
- 40% ................................ 188
- 50% ................................ 196
- 60% ................................ 206
- 70% ................................ 234
- 80% ................................ 296
- 90% ................................ 340
- Final ............................... 360

Gravity, °API at 60° F ............... 34.7
Bromine number, cg. Br$_2$/g ......... 104.1
Maleic anhydride value, mg. M. A./g .. 79
Index of refraction, $n_D^{25}$ ...... 1.4830

Analysis, volume-percent:
- Propane and propylene ............... 0.7
- Isobutane ........................... 0.1
- Isobutylene ......................... 0.8
- 1-butene ............................ 0.5
- 2-butene ............................ 0.6
- n-Butane ............................ 0.4
- Butadiene ........................... 3.9
- Pentadienes ......................... 7.7
- Pentylenes .......................... 6.3
- Other C$_5$ ......................... 0.4
- Benzene ............................. 34.2
- Toluene ............................. 7.8
- Xylenes ............................. 1
- Styrene ............................. 3
- Dicyclopentadiene ................... 5
- Other ............................... 29.6

For the charging stock in the preparation of resins by my new process, I can employ the total Dripolene mixture obtained as described above, or a distillate or bottoms fraction thereof. An especially desirable charging stock is a 70 to 90 percent Dripolene distillate fraction, such as a so-called "80 percent Dripolene overhead" fraction, obtained by fractionally distilling the total Dripolene and separating therefrom the desired proportion of the Dripolene as a distillate fraction. Other fractions can also be employed satisfactorily in the process of my invention, yielding resins of somewhat different characteristics.

In practicing my invention, a Dripolene charging stock is combined with iodine and boron trifluoride, and the mixture is heated to polymerization temperature. Thereafter, the reaction product is depressurized and stripped of BF$_3$, and is finally subjected to any additional desired purification treatment. The iodine should be used in a minimum proportion of about 0.02 percent by weight, preferably between about 0.02 and 2, optimally around 0.05. The BF$_3$ should be used in a proportion between about 0.5 and 5 percent by weight, optimally around 3. The reaction temperature should be between about 500 and 650° F., optimally about 575° F., and should be maintained for about 0.1 to 10 hours, preferably 0.25 to 1 hour. Removal of the BF$_3$ is preferably effected by flashing or stripping at a temperature within the polymerization range.

In one embodiment, my new process comprises the following steps: A Dripolene charging stock is introduced into an evacuated or gas-blanketed pressure-type reactor. Crystalline iodine (around 0.05 percent by weight) is commingled therewith, and BF$_3$ (around 3 percent) is slowly introduced into the reaction zone while the reaction mixture is agitated by suitable means. The BF$_3$ addition rate is preferably regulated so that the temperature does not exceed 120° F. during the catalyst addition. After all of the BF$_3$ has been added, the mixture is heated rapidly with agitation to a temperature of about 575° F., where it is maintained for about 30 minutes. At the end of this time, the BF$_3$ is flashed off at a temperature between about 500 and 650° F. The resulting resin ordinarily has a Barrett color of about 4 or lighter, and can be further decolorized if desired by methods known in the art. Thereafter, it is stripped with a gaseous hydrocarbon or other inert gas to a ring-and-ball softening point of about 150 to 250° F. A purified resin is obtained thereby, having a Barrett color lighter than 4, an iodine number less than about 80 (ordinarily between about 30 and 50), and excellent resistance to deterioration in color and mechanical structure with age.

The supplemental decolorization, referred to above, can be effected by agitating the resin at ordinary temperatures with about 5 to 15 pounds per barrel of 95 percent sulfuric acid. Substantially any other strong mineral acid, such as phosphoric acid, hydrogen fluoride, and the like, can also be used for this purpose. Any suspended acid can be removed from the resin by washing with caustic or ammonium hydroxide, by filtration through soda lime, or by filtration through clay or other adsorbent solid. Suitable adsorbent solids include bauxite, silica gel, magnesium silicate, kieselguhr, infusorial earth, diatomaceous earth, and various clays, such as fuller's earth and bentonite, which contain predominantly aluminum silicates. Among the more commonly used clays are Attapulgus clay and the Florida earths, generally known by trade names such as "Floridin" and "Florex." Clay filtration after acid treatment is not only an effective method of removing the suspended acid, with an excellent clay life of over 50 barrels of resin per ton of clay, but it also produces an additional degree of decolorization. Clay filtering alone, without prior acid treatment, is also an effective method for color improvement.

An essential feature of my invention lies in the simultaneous exposure of my charging stock to the action of iodine and BF$_3$. A preliminary treatment of the charging stock with iodine alone, followed by polymerization in the presence of BF$_3$ alone, is ineffective to produce resins of light color; it appears, therefore, that the action of iodine and BF$_3$ is synergistic in nature.

An important feature of my invention is the polymerization temperature, which should lie between about 500 and 650° F., preferably around 575° F., varying inversely as a function of the BF$_3$ concentration. For example, at a BF$_3$ concentration of 5 percent by weight, the optimum polymerization temperature lies between about 500 and 525° F., and at a BF$_3$ concentration of 0.5 percent by weight, the optimum lies between about 625 and 650° F. The optimum temperature does not appear to vary substantially with the iodine concentration. Under the foregoing conditions, resins are produced which are substantially lighter in color than resins produced under other conditions.

Another important feature of my invention is the step of hot-flashing the BF$_3$ from the polymerized charging stock at a temperature within the polymerization range. If the polymerization mixture is cooled before removal of the BF$_3$, it is generally necessary to reheat the mixture in order to expel the BF$_3$, and the quality of the resin is thereby impaired.

Water and oxygenated organic compounds have a detrimental influence in my process, and should therefore be removed and/or excluded substantially completely from the charging stock and other process materials. This can be effected by passing the materials through a bed of calcium chloride, anhydrous sodium sulfate, soda lime, or other dehydrating solid which has no appreciable polymerizing effect upon the unsaturated components thereof. Surface-active adsorptive solids such as silica gel and aluminum oxide are unsuitable, since they appear to catalyze exothermic reactions in the charging stock, and lead to the production of undesirably dark resins.

For the same reason, complexes of boron trifluoride with organic oxygenated compounds are not suitable as catalysts in my process, although they have been widely used as catalysts in other polymerization processes. My process employs boron trifluoride alone, in combination with iodine, but it will be understood that the catalyst can be permitted to include ingredients which are inert under the reaction conditions. The iodine is preferably introduced into the reaction mixture in the crystalline form or as a solution in a suitable inert solvent. The $BF_3$ is preferably introduced as a gasiform stream into the polymerization zone with vigorous agitation in order to minimize the occurrence of local transient zones of high catalyst concentration therein.

The polymerization can optionally be carried out in an inert solvent for the final resin, such as a light petroleum naphtha, benzene, toluene, xylene, isooctane, gasoline, or other aromatic or aliphatic hydrocarbon liquid or mixture thereof. The presence of such a solvent is especially desirable during any supplemental decolorization step or steps, since the polymerization product is ordinarily so viscous that it cannot be satisfactorily contacted in undiluted form with a decolorizing agent. The solvent is conveniently employed in a ratio between about 0.25 and 5 volumes per volume of charging stock. The greater part of the solvent can readily be removed from the polymerization product by distillation, the residual portion being removed in the final stripping of the resin.

The products of my invention are resins of iodine number below about 80, ordinarily between about 30 and 50, of color lighter than about 4 Barrett, ordinarily about 3 or lighter, of excellent color and mechanical stability, and having a ball-and-ring softening point between about 150 and 250° F. These resins are especially well adapted as components of mastic floor tiles, as components of oleoresinous varnishes either alone or in admixture with other varnish resins, as plasticizers and softeners for natural or synthetic rubber, and as extenders for rubber, ethyl cellulose, and ester gum in typical adhesives based thereon. Other uses will be apparent to those skilled in the art.

My invention will be more fully understood from the following specific examples.

*Example I*

The effect of iodine concentration was studied in a series of polymerization tests on a number of 80 percent overhead Dripolene distillate fractions. The Dripolene stock was introduced into a high-pressure reaction bomb with the desired proportion of $BF_3$ and iodine. The bomb was heated for 20 to 25 minutes with a gas burner to a maximum temperature of 550° F., and the temperature was maintained at 550° F. for an additional 15-minute period. The reaction product was thereafter flashed and stripped at reaction temperature to a ball-and-ring softening point of 200–210° F. The results were as follows:

| Dripolene Stock | $BF_3$, wt. percent | $I_2$, wt. percent | Reaction Temp., °F. | Total Reaction Time, min. | Resin Yield, wt. percent | Gardner Color | Barrett Color |
|---|---|---|---|---|---|---|---|
| A | 3.0 | 0.020 | 550 | 35 | 33.5 | 14.5 | 3.5 |
| B | 3.0 | 0.020 | 550 | 35 | 34.5 | 15 | 4 |
| C | 3.0 | 0.012 | 550 | 35 | 36.9 | 16 | 4 |
| C | 3.0 | 0.020 | 550 | 35 | 36.6 | 14.5 | 3.5 |
| D | 3.0 | 0.010 | 550 | 35 | 33 | 16 | 4 |
| D | 3.0 | 0.020 | 550 | 35 | 32.6 | 14.5 | 3.5 |
| D | 3.0 | 0.020 | 550 | 35 | 33.5 | 14.5 | 3.5 |

The foregoing data show that an iodine concentration of the order of 0.020 weight-percent is effective in improving the color of Dripolene resins from 16 Gardner (dark red) to around 14.5 Gardner (between pale and light red).

*Example II*

The effect of iodine concentration was further studied in the following series of experiments. In each experiment, an 80 percent overhead Dripolene distillate fraction was charged with $BF_3$ and iodine into a high-pressure reaction bomb, and the bomb was heated for 30 minutes to a maximum temperature of 575° F. and maintained at this temperature for 20 minutes. The bomb was then depressured at the reaction temperature, and the resin solution was gas-stripped to a 200–210° F. softening point. The iodine numbers of the resulting resins were consistently within the 40–50 range. Complete data from the tests were as follows:

| Dripolene Stock | $BF_3$, wt. percent | $I_2$, wt. percent | Reaction Temp., °F. | Total Reaction Time, min. | Resin Yield, wt. percent | Gardner Color | Barrett Color |
|---|---|---|---|---|---|---|---|
| E | 3.0 | 0 | 575 | 50 | 29.5 | 17.5 | 5 |
| E | 3.0 | 0.02 | 575 | 50 | 31.0 | 15 | 4 |
| E | 3.0 | 0.03 | 575 | 50 | 31.0 | 14.5 | 3.5 |
| E | 3.0 | 0.04 | 575 | 50 | 31.0 | 14.5 | 3.5 |
| F | 3.0 | 0.02 | 575 | 50 | 29.0 | 16 | 4 |
| F | 3.0 | 0.03 | 575 | 50 | 29.0 | 15 | 3.5–4 |
| F | 3.0 | 0.04 | 575 | 50 | 30.8 | 14 | 3 |

From the foregoing data it appears that the maximum color improvement is attained at an iodine concentration of approximately 0.03 weight-percent.

Example III

In order to ascertain the optimum temperature for polymerizing Dripolene with $BF_3$ and iodine, a series of tests were carried out on an 80 percent overhead Dripolene distillate fraction in which the $BF_3$ and iodine concentrations were maintained substantially constant while the polymerization temperature was chosen within the range of 550 to 650° F. The complete reaction mixture was raised to the desired reaction temperature over a period of 30 minutes, and was then held at the reaction temperature for an additional period of 15 to 25 minutes as indicated below. The procedure employed was otherwise substantially the same as in Example I. The following results were obtained:

| Dripolene Stock | $BF_3$, wt. percent | $I_2$, wt. percent | Reaction Temp., °F. | Total Reaction Time, min. | Resin Yield, wt. percent | Gardner Color | Barrett Color |
|---|---|---|---|---|---|---|---|
| E | 3.4 | 0.02 | 550 | 45 | 31.2 | 17 | 4.5 |
| E | 3.2 | 0.02 | 580 | 45 | 29.4 | 15.5 | 4 |
| E | 3.3 | 0.02 | 600 | 50 | 28.9 | 16 | 4.5 |
| E | 3.1 | 0.02 | 650 | 55 | 26.4 | 18 | 5 |

These results indicate that both the color and the yield of resins are best at temperatures around 580° F.

Example IV

In order to study the optimum $BF_3$ concentration, a series of polymerizations were carried out as described in Example II in which the $BF_3$ concentration was varied from 1.7 to 4 weight-percent. The following data were obtained:

| Dripolene Stock | $BF_3$, wt. percent | $I_2$, wt. percent | Reaction Temp., °F. | Total Reaction Time, min. | Resin Yield, wt. percent | Gardner Color | Barrett Color |
|---|---|---|---|---|---|---|---|
| G | 1.7 | 0.02 | 575 | 45 | 30.2 | 17 | 4.5 |
| G | 3.4 | 0.02 | 575 | 45 | 30.7 | 16 | 4 |
| G | 4.0 | 0.02 | 575 | 45 | 30.1 | 17 | 4.5 |

Under the conditions employed in the foregoing tests, a $BF_3$ concentration of approximately 3 weight-percent appears to be the optimum.

Example V

In order to evaluate the importance of agitation during polymerization of an 80 percent overhead Dripolene distillate fraction with $BF_3$ and iodine, a number of experiments were carried out in which the reaction bomb was heated electrically to 575° F. without shaking. A period of 2.5 hours was required to reach this temperature, at which point the bomb was depressured and the contents were stripped to a 200–210° F. softening point. The following results were obtained:

| Dripolene Stock | $BF_3$, wt. percent | $I_2$, wt. percent | Reaction Temp., °F. | Reaction Time, min. | Resin Yield, wt. percent | $I_2$ No. | Gardner Color | Barrett Color |
|---|---|---|---|---|---|---|---|---|
| H | 3.3 | 0.03 | 575 | 150 | 33.0 | 40 | 15 | 3.5 |
| H | 3.3 | 0.03 | 575 | 150 | 32.0 | 42 | 15 | 3.5 |
| H | 3.4 | 0.03 | 575 | 150 | 33.1 | 36 | 15 | 3.5 |

These data demonstrate that light-colored resins are produced by carrying out the polymerization without agitation. From this it follows that the reaction system is homogeneous under the reaction conditions, and that agitation is of benefit only in reaction equipment having poor heat-transfer characteristics.

Example VI

A group of polymerization tests were carried out on miscellaneous charging stocks at 575° F. according to the procedure employed in Example II. The results were as follows:

| Dripolene Stock | $BF_3$, wt. percent | $I_2$, wt. percent | Reaction Temp., °F. | Total Reaction Time, min. | Resin Yield, wt. percent | Gardner Color | Barrett Color |
|---|---|---|---|---|---|---|---|
| E | 3.3 | 0.02 | 575 | 45 | 28.4 | 16 | 4 |
| F | 3.2 | 0.03 | 575 | 45 | 27.0 | 14 | 3 |
| F | 3.4 | 0.03 | 575 | 45 | 30.4 | 14.5 | 3.5 |
| G | 3.0 | 0.03 | 575 | 45 | 30.6 | 14 | 3 |
| H | 3.2 | 0.03 | 575 | 45 | 29.0 | 14.5 | 3.5 |
| J | 3.2 | 0.03 | 575 | 45 | 29.0 | 14 | 3 |
| J | 3.3 | 0.03 | 575 | 45 | 28.0 | 14.5 | 3.5 |

Example VII

The following experiments were carried out to compare $BF_3$-iodine polymerization with a two-step process employing an iodine pretreatment followed by polymerization with $BF_3$ alone.

An 80 percent overhead Dripolene distillate fraction was charged with 0.03 weight-percent iodine into a reaction bomb. The mixture was heated for 90 minutes to a maximum temperature of 575° F. and held at 575° F. for an additional period of 15 minutes. Thereafter, the bomb and its contents were cooled to room temperature, 3.0 weight-percent of BF3 was added, and the bomb was again heated to 575° F., the respective heating and holding periods being 30 and 15 minutes. The bomb was depressurized at reaction temperature, and the contents were gas-stripped to a softening point of 200–210° F. The product had a color of 16 Gardner and 4 Barrett.

When the above experiment was repeated in a single step (i. e., the Dripolene fraction was polymerized in the presence of BF3 and iodine without pretreatment), the product had a color of 14.5 Gardner and 3.5 Barrett.

While I have described the process of my invention in connection with certain specific embodiments thereof, and have illustrated my invention with examples employing certain specific charging stocks and operating conditions, it is to be understood that I am not limited thereto, but may practice my invention in accordance with the broad disclosure thereof. It is further to be understood that any modifications or equivalents that would ordinarily occur to one skilled in the art are to be considered as lying within the scope of my invention.

In accordance with the foregoing description, I claim as my invention:

1. A process for making a resin from a normally liquid mixture of unsaturated hydrocarbons obtained in the pyrolysis of a normally gaseous hydrocarbon having at least two carbon atoms in the molecule, which comprises contacting said normally liquid mixture of unsaturated hydrocarbons with above about 0.5 percent by weight of boron trifluoride and at least about 0.02 percent by weight of iodine at a temperature above about 500° F., whereby a portion of said unsaturated hydrocarbons is converted into a thermoplastic resin of low iodine number and light color, and recovering said resin from the reaction product.

2. A process for making a resin from a normally liquid mixture of unsaturated hydrocarbons obtained in the pyrolysis of a normally gaseous hydrocarbon having at least two carbon atoms in the molecule, which comprises contacting said normally liquid mixture of unsaturated hydrocarbons with between about 0.5 and 5 percent by weight of boron trifluoride and between about 0.02 and 2.0 percent by weight of iodine at a temperature between about 500 and 650° F., whereby a portion of said unsaturated hydrocarbons is converted into a thermoplastic resin of idoine number below about 80 and light color, and recovering said resin from the reaction product.

3. A process for making a resin from a normally liquid mixture of unsaturated hydrocarbons obtained in the pyrolysis of a normally gaseous hydrocarbon having at least two carbon atoms in the molecule, which comprises contacting said normally liquid mixture of unsaturated hydrocarbons with between about 0.5 and 5 percent by weight of boron trifluoride and around 0.05 percent by weight of iodine at a temperature around 575° F., whereby a portion of said unsaturated hydrocrabons is converted into a resin, and removing catalyst and low-boiling components from the reaction product, whereby a thermoplastic resin is obtained having an iodine number below about 80 and a Barrett color lighter than about 4.

4. A process for making a resin from a normally liquid mixture of unsaturated hydrocarbons obtained in the pyrolysis of a normally gaseous hydrocarbon having at least two carbon atoms in the molecule, which comprises separating a distillate fraction from said normally liquid mixture of unsaturated hydrocarbons, contacting said distillate fraction with above about 0.5 percent by weight of boron trifluoride and at least about 0.02 percent by weight of iodine at a temperature between about 500 and 650° F., whereby a portion of said unsaturated hydrocarbons is converted into a thermoplastic resin of low iodine number and light color, and recovering said resin from the reaction product.

5. A process for making a resin from a normally liquid mixture of unsaturated hydrocarbons obtained in the pyrolysis of a normally gaseous hydrocarbon having at least two carbon atoms in the molecule, which comprises separating a 0–80 volume percent distillate fraction from said normally liquid mixture of unsaturated hydrocarbons, contacting said distillate fraction with between about 0.5 and 5 percent by weight of boron trifluoride and between about 0.02 and 2.0 percent by weight of iodine at a temperature between about 500 and 650° F., whereby a portion of said distillate fraction is converted into a resin, flashing boron trifluoride from the reaction mixture at a temperature between about 500 and 650° F., and stripping the reaction product to a ball-and-ring softening point between about 150 and 250° F., whereby a hydrocarbon resin is obtained having an iodine number below about 80 and a Barrett color lighter than about 4.

FRANCIS T. WADSWORTH.

No references cited.